United States Patent [19]
Brusov et al.

[11] 3,876,419
[45] Apr. 8, 1975

[54] METHOD OF THERMAL AND CHEMICAL TREATMENT OF SOLIDS OF STARTING MATERIAL NOT OVER 0.5 MM IN SIZE

[76] Inventors: Lev Petrovich Brusov, Bulvar Shakhlostroitelei, 22, kv. 32, Donetsk; Dmitry Pavlovich Vasilevsky, Ul. Pravdy; 5, kv. 9, Kharkov; Vasily Ivanovich Dorokhov, Ul. Dzerzhinskogo, 34, kv. 6, Kharkov; Vasily Petrovich Onoprienko, Ul. Sumskaya 118, kv. 16, Kharkov, all of U.S.S.R.

[22] Filed: June 1, 1973

[21] Appl. No.: 366,216

Related U.S. Application Data

[63] Continuation-in-part of Ser. No. 52,196, July 6, 1970, abandoned.

[52] U.S. Cl. ............... 75/26; 209/138; 209/139 R
[51] Int. Cl. .................. C21b 1/02; C22b 1/10
[58] Field of Search .......... 52/196; 75/26; 209/138, 209/139 R, 140

[56] References Cited
UNITED STATES PATENTS

| | | |
|---|---|---|
| 1,504,439 | 8/1924 | France .............................. 209/138 |
| 2,561,396 | 7/1951 | Matheson ........................... 75/26 X |
| 2,813,318 | 11/1957 | Horth .............................. 209/139 R |

FOREIGN PATENTS OR APPLICATIONS

| | | |
|---|---|---|
| 13,459 | 10/1934 | Australia ........................... 209/139 R |
| 125,440 | 1/1960 | U.S.S.R. ............................ 209/138 |
| 249,856 | 5/1948 | Switzerland ........................ 209/140 |

*Primary Examiner*—Allen B. Curtis

[57] ABSTRACT

A method of thermal and chemical treatment of solids of the starting material not over 0.5 mm in size resides in that the solids of the starting material under treatment are introduced into a stream of gas to form gas-suspended matter, and are treated in the course of their conveyance by said stream of gas, whereupon said solids treated in the gas-suspended state are split into more-than-two streams according to their gas-dynamic characteristics, and each stream of said solids is subjected to aftertreatment in a stream of gas that flows in a direction opposite to the direction of flow of the stream of said solids under treatment, the process parameters of said gas involved in said aftertreatment of the solids, being so selected as to provide the conditions under which said solids under treatment are free to move down under their gravitational forces.

4 Claims, 1 Drawing Figure

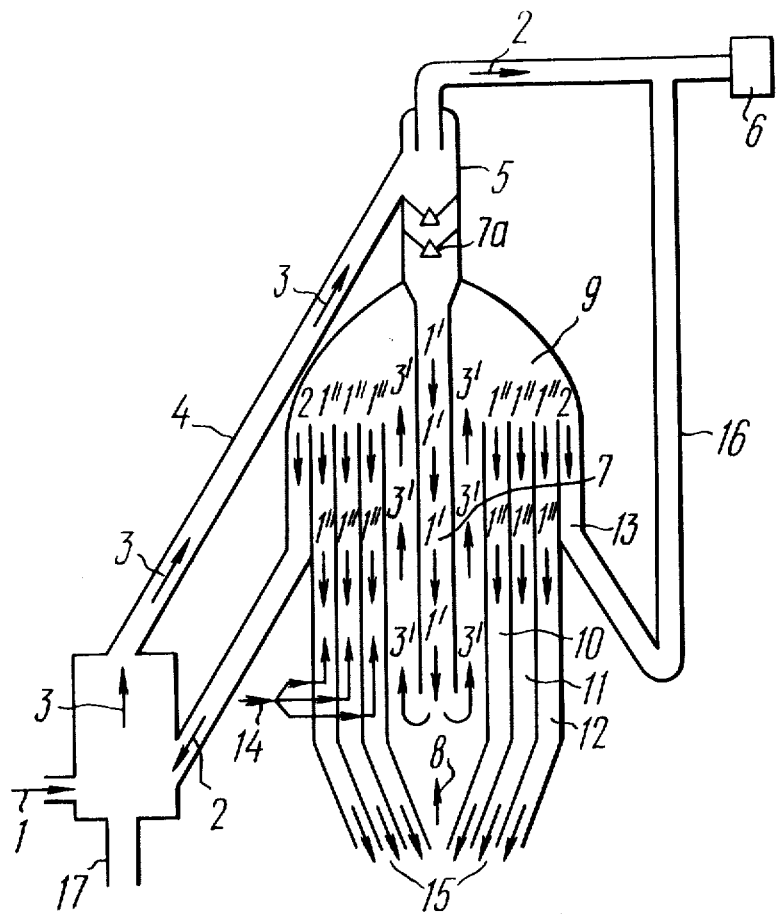

METHOD OF THERMAL AND CHEMICAL TREATMENT OF SOLIDS OF STARTING MATERIAL NOT OVER 0.5 MM IN SIZE

The present application is a continuation-in-part of application Ser. No. 52,196 filed on July 6, 1970 and now abandoned.

The present invention relates generally to such branches of industry where finely-divided materials undergo thermal and chemical treatment in a gas stream, and is concerned particularly with a method of thermal and chemical treatment of the solids of a starting material not over 0.5 mm in size.

The invention can find application in, say, metallurgical industry for reducing roasting of iron ores (direct production of powdered metals, metallization of ore concentrate and ore fines, magnetic roasting of hard-to-dress ores, etc.); for oxidizing roasting of sulphide and other ores of nonferrous metals; for calcination of cement clinker; for dehydration of finely-divided materials.

Known to be in current use are methods of thermal and chemical treatment of the solids of a starting material with a gas.

In the practice of powder metallurgy the most practicable method of treating the solids of a starting material is one whereby said solids are treated in a fixed bed.

The method of treating materials in a fixed bed, however, suffers from too low efficiency and, therefore, installations for its realization possess but low production output. Besides, the processes proceeding a fixed bed are hardly amenable both to control and monitoring which is responsible for high operational and labour costs. Such processes are resorted to for producing relatively expensive and specific materials. Installations and plants for carrying such method into effect (such as crucibles, fire pots, stools, bottom plates, capsules with muffle, tunnel, rotary-ring and other types of furnaces, grates with a filled-on bed, etc.) have but a low estimated capacity (about 15,000 tons of sponge iron per annum).

Another method of treatment of materials is known to use heretofore, consisting in their treatment while being conveyed by gas (in a unidirectional flow) as is the case, say, in treating iron-ore concentrates.

Such method of treating materials while conveying tham by a unidirectional flow of gas is distinguished by high efficiency of the process involved. However, the method suffers from a substantial disadvantage, viz., low gas utilization factor per cycle both in chemical and thermal respects. This gave rise to multicycle installations for treatment of materials in a unidirectional flow of gas which are instrumental in obtaining higher gas utilization factors. However, such installations, wherein multicycle treatment of finely-divided materials occurs (e.g., multistage reactors, cyclone batteries, a system of swirl chambers, etc.) are very bulky, too. The material is conveyed from stage to stage with a considerable difficulty, while the material handling mechanisms are inadequately reliable. That is why the method of multicycle treatment of the solids of a starting material in a unidirectional flow failed to find widespread application in industrial practice.

Still another method of treatment of the solids of a starting material is now in current use, vis., with the gas in shaft furnaces, fluidized-bed reactors, as well as in travelling-bottom installations.

Such a method is low economic due to high losses of the untreated material carried over from the production plants which results in that the material treatment characteristics (consumption of gas, coefficient of useful heat utilization, etc.) specified for the final product, are substantially affected.

Still another method is now known for separation (segregation) of a mixture of finely-divided materials in a stream of gas, called the Mateson method.

However, said method fails to provide thermal and chemical treatment of the material which proves to be a substantial disadvantage thereof.

It is therefore an essential object of the present invention to overcome the disadvantage inherent in the known methods of thermal and chemical treatment of the solids of a starting material.

It is another object of the present invention to intensify the material treatment process.

It is one more object of the present invention to reduce gas consumption rate.

It is still another object of the present invention to increase the heat utilization coefficient.

Said objects are attained due to the fact that in the herein-proposed method of thermal and chemical treatment of the solids of a starting material not over 0.5 mm in size by virtue of treating said solids in a stream of gas to form gas-suspended matter and aftertreatment of said solids when in the gas-suspended state, with gas, according to the invention said solids of a starting material are treated, when conveyed in said gas stream to form gas-suspended matter, the solids thus treated in the gas-suspended state are split into more-than-two streams according to their gas-dynamic characteristics and each stream of said solids is subjected to said aftertreatment in a stream of gas flowing in a direction opposite to the direction of movement of a stream of the solids under treatment, the process parameters of said gas used for aftertreatment of solids, being so selected as to provide the conditions under which downward motion of the solids being treated is ensured due to their own gravity.

It is expedient that as a gas for establishing gas-suspended matter use be made of waste flue gas.

The flow velocity of said gas for establishing gas-suspended matter and for said conveyance of solids is preferable to be selected within 30–80 m/sec.

It is desirable that the treatment period of said solids in the course of their conveyance by said flow of gas for establishing gas-suspended matter be within 11–20 sec.

It is preferential that the process parameters of said gas for aftertreatment of solids in magnetic roasting of iron-ore materials be selected as follows:
pressure - ca. 3800 n/m$^2$;
flow velocity - within 0.2 to 2.8 m/sec;
temperature - so as to provide a temperature of the solids aftertreatment process not in excess of 700°C.

The process parameters of the gas for said aftertreatment of solids in case of metallization of iron-ore materials are expedient to be selected as follows:
temperature - maximum 830°C;
pressure - ca.49000 n/m$^2$;
flow velocity - within 0.2 to 1.4 m/sec.

The period of aftertreatment of said solids with gas in magnetic roasting of iron-ore materials may be selected within 35–40 sec, while that in metallization of iron-ore materials, within 120–180 sec.

The proposed invention features high technical and economical characteristics that have been corroborated during prolonged experimental trials of the claimed method on pilot and half-way plants.

The results of the experiments performed have shown the following:

losses of untreated material due to its being carried over from the plant proves to be minimized (not over 0.1 percent);

the process of treatment of finely divided material are so intensified that the specific output capacity of the plant (i.e., the amount of product obtained from unit useful working space per unit time of its operation, also referred to as space-time yield) is 7 to 50 times that of the specific output capacity of the known plants performing the respective technological processes (roasting of ores, metallization of iron-ore concentrates, etc.);

the plant is simple-to-manufacture which, alongside with its high specific output capacity allows the amount of specific capital investments to be reduced by 30 percent as compared to those in plants intended for the same production processes. Thus, say, the capital investments in the construction of the plant according to the claimed method for metallization roasting of iron-ore concentrate with a yearly production capacity over 1 million tons are but as low as 80-90 percent of the capital investments required for the construction of one Cowper blast stove of a modern blast furnace, whereas the capital investments in the construction of the plant according to the same method for magnetic roasting of iron ores followed by dressing and pelletizing of iron ores make up as low as 90 percent of the investments required for the construction of the whole line of plants intended solely for kilning ore pellets and possessing the respective production capacity;

the proposed method ensures the fullest and most efficient utilization of heat and of the process characteristics of the working gas, whereby, say, specific heat consumption for magnetic roasting of wet quartzites (with a 4 percent moisture content) per ton of the starting material equals 280,000 Kcal, while specific consumption of natural gas for metallization of rich iron-ore concentrates can be reduced to 200 $m^3$ per ton of the finished product at 90 percent metallization of iron ore;

any production process carried out according to the proposed method in the proposed plant is easily monitored and controlled and therefore is amendable to a full mechanization and automation, whereby labour and operational costs can be minimized so as to be involved only in supervision over the functioning of all mechanisms and instruments;

the plant operating according to the proposed method may possess an estimated capacity higher than that of the most efficient up-to-date used in large-scale production (such as modern blast furnaces, oxygen-blown steel converters, electric furnaces, etc.).

Moreover, the proposed method involves no water for its realization, while the waste flue gas can be utilized to its best by way of recirculation, and can be fully get rid of the material being handled, because the plant can operate at any preset excess gas pressure effective within the working space. Due to this fact the proposed method can be used and the plant for its realization can be constructed practically anywhere, including areas depleted in water, in densely-populated localities or in areas with particularly exacting demands as regards the purification of industrial waste products in order not to pollute the air and water basins.

In what follows the invention will be made more evident by a consideration of specific illustrative embodiments thereof to be had in conjunction with the accompanying drawing which represents the production flowsheet of the process of gas and material interaction to carry into effect the method, according to the invention.

Thermal and chemical treatment of the solids of a starting material occurs as follows.

A starting material 1 subject to treatment is fed into a stream of a waste flue gas 2.

As a result, the solids of the starting material 1 are entrained by the stream of the waste flue gas 2 and, having been turned into a gas-suspended matter 3, is conveyed by said gas along a gas-lift 4.

While being conveyed the solids 1 of the starting material are partly treated with the conveying gas, including dehydrating and heating thereof.

Formation of gas-suspended matter, conveyance and partial treatment of the material can be effected according to every particular embodiment of the proposed method, both in the medium of waste flue gas and of any other additionally fed gas having a pressure exceeding that of the gas used for establishing gas-suspended matter. The composition of the gas conveying the gas-suspended matter may also differ from that of the gas from establishing the latter and that of the waste flue gas.

In all the embodiments the gas-suspended matter 3 is fed from the gas-lift 4 into a cyclone 5 to effect a sharp turn (in excess of 90°) of the stream of the gas-suspended matter 3 without any substantial wearout upon the gas-lift 4 at the point of turn, as well as for separating the starting material 1 from its conveying gas 2. From the cyclone 5 the gas 2 is fed upwards to a wet scrubber 6, while a partly treated material 1' is fed downwards to a central chamber 7 through the gas sluice gate 7a.

In the central chamber 7 the material 1' is treated with gas 8 in co-current therewith. The material 1' while moving, makes a turn through about 180° and is conveyed over the central chamber 7 as another gas-suspended matter 3'. When in the central chamber 7 the material 1 is subjected to a secondary partial treatment with the gas 8 both in a countercurrent of the gas 8 and in the uniform stream of the material 1' during its upward motion in the central chamber 7.

A material 1'' that has passed secondary partial treatment with the gas 8, is conveyed as the gas-suspended matter 3' from the central chamber 7 into a chamber 9 for being split therein according to the gas-dynamic characteristics of the solids it carries, the bottom portion of said chamber 9 communicating with the top portions of chambers 7, 10, 11, 12 and 13. The stream of the gas-suspended matter 3', while passing through the chamber 9 from the central chamber 7 to the extreme chamber 13, gradually decelerates, whereby the solids get classified according to their gasdynamic characteristics, viz., those possessing the highest floating speed (as a rule, larger solids) settle down from the stream into a vertical annular chamber 10, while solids having somewhat lower floating speed get settled down in a vertical annular chamber 11 and finest solids of the secondary partially treated material 1'' having the lowest floating speed, are separated out from the stream of the gas-suspended matter in a vertical annular chamber 12 or are entrained by the waste flue gas 2 into the extreme chamber 13.

The preclassified secondary partially treated material 1″ from the chamber 9 settles down in the vertical annular chamber 10, 11 or 12 according to its gas-dynamic characteristics. Fed against the dropping down solids along the concentrical vertical annular chambers 10, 11 and 12, are upward streams of a gas 14 having the appropriate parameters, viz., flow velocity, pressure and temperature. As the material 1″ goes down in a countercurrent of the gas, its solids undergo aftertreatment, and the final product in the form of completely treated solids 15 is discharged from the bottom portion of the vertical annular chambers 10, 11 and 12. Final gas-dynamic classification of the material 1″ occurs due to the effect of the gas 14 in the chambers 10, 11 and 12. Solids having the floating speed out of keeping with the flow velocity of the gas 14 in the chamber into which they have got accidentally, are transferred by the flow of the gas 14 into another chamber, wherein the process parameters of the flue gas correspond to the gas-dynamic characteristics of the solids under consideration. Due to gas-dynamic classification of the material 1 according to gas-dynamic properties of its solids, followed by an after-treatment in a countercurrent of the gas 14, the formation of a suspended fluidized bed is attained and high technical and economic characteristics of the proposed method are obtained.

The further movement of gas-suspended matter is provided by means of progressive reduction of gas pressure in the working space. The largest pressure of gas is under the gas sluice gate 7a, but in the chamber 9 it is lower by the value of pressure losses in the course of conveyance of gas-suspended matter 1′ and 3′ while it is lower than the gas pressure 14, but higher than the waste gas pressure 2.

The lowest gas pressure is in the scrubber 6 and higher than the pressure in the cyclone 5. The pressure in the cyclone 5 is lower than the waste gas pressure 2.

The stream of the waste flue gas 2 from the chamber 9 carrying same part of the untreated material 1″, is fed into the extreme chamber 13 and, upon getting rid from said material, it returns again to the starting material 1.

When the plant operates on a principle, involving the formation of gas-suspended matter and its conveyance along the gas-lift 4 by means of another additionally fed gas at a pressure higher than the pressure of the gas used for the formation of gas-suspended matter, the waste flues gas is not fed again to the starting material 1 but is directed along a pipeline 16 for the scrubber 6.

Besides, said additionally introduced gas is fed to the starting material 1 to form gas-suspended matter, along a pipeline 17.

An optimum feature of the proposed method is that the entire conveyance, classification and treatment of the material is effected by the gas of the corresponding parameters (pressure, flow velocity, temperature and composition).

Gas 14, flowing through the chambers 9, 10 and 12 can have the same composition in every chamber 10, 11 and 12.

For some particular cases the application of this method is advisable to use the gas with the different chemical potentials in every particular chamber 10, 11 and 12. The gas 8 and the gas, flowing along the pipeline 16, are different in their composition and differ from gas composition 14. For various uses of the method given on page 6, the gas composition 14 is characterized by the following relation:

$$\beta = CO + H_2/CO + H_2 + CO_2 + H_2O$$

for magnetic roasting of iron ores $\beta \geq 0.28$, for metallization of iron-ore concentrate $\beta \geq 0.92$.

Gas composition 8 and the composition of gas, flowing through the pipeline 16, are similar to the products of natural gas or recirculation gas burning (waste gas after its refining and moisture condensation) with lack of air or oxygen.

The lack of air for magnetic roasting $\alpha \geq 0.9$, for metallization $\alpha \geq 0.46$.

Thus, e.g. when the proposed method is applied for magnetic roasting of iron ores, it is recommended that the following process parameters should be adhered to:

flow velocity of gas in the process of conveying the solids - 30–80 m/sec; treatment time of the solids in the course of their conveyance - 11–13 sec.

The process parameters of another gas for aftertreatment of solids in a countercurrent thereof:
pressure - 3800 n/m²,
flow velocity within 0.2 to 2.8 m/sec, including: in the chamber 9 2.2 to 2.8 m/sec, in the chamber 10 - 0.8 to 2.2 m/sec, and in the chamber 11 0.2 to 0.8 m/sec; the temperature of the gas is so selected as to provide the temperature of the aftertreatment process of solids not above 700°C.

Time required for aftertreatment of solids with another gas (in a countercurrent) is 35–40 sec.

For realization of the method with respect to metallization of iron ores, it is expedient that the following process parameters be used:

velocity of the flow of gas in the process of conveyance of the solids - 30–50 m/sec;
the treatment time for solids during their conveyance - 15–20 sec.

The process parameters of another gas used in aftertreatment of the solids in a countercurrent thereof:
temperature - 830°C
pressure - 49,033 n/m²
range of flow velocity - 0.2 to 1.4 m/sec,
including that in the chamber 9 - 0.8 to 1.4 m/sec, in the chamber 10 - 0.4 to 0.8 m/sec, and in the chamber 11 - 0.2 to 0.4 sec. Time of the aftertreatment of the solids with another gas (in a countercurrent) -120–180 sec.

What is claimed is:

1. A method of thermal and chemical treatment of finely divided solids not over 0.5 mm in size, comprising the following steps: introducing the solids under treatment into a stream of gas to form gas-suspended matter and treating said solids in the course of their conveyance by said stream of gas; splitting the solids treated in the gas-suspended state into more than two streams according to their gas-dynamic characteristics; and subjecting each of said streams to aftertreatment in a stream of gas flowing in a direction opposite to the direction of the stream of solids under treatment; the process parameters of said gas for aftertreatment of the solids being so selected as to provide downward motion of the solids under their own weight, wherein said gas for said aftertreatment of said solids has a pressure of about 3800 $n/m^2$ and a flow velocity within the range 0.2 to 2.8 m/sec, the gas temperature is selected so as to provide a temperature of solids aftertreatment not over 700°C, and the gas composition is characterized by the relation of contents $$CO + H_2/CO + H_2 + CO_2 + H_2O$$

0.28, whereby magnetic roasting of iron-ore materials is carried out.

2. A method as claimed in claim 1 wherein the duration of said aftertreatment of said solids with said gas is within the range 35–40 sec.

3. A method of thermal and chemical treatment of finely divided solids not over 0.5 mm in size, comprising the following steps: introducing the solids under treatment into a stream of gas to form gas-suspended matter and treating said solids in the course of their conveyance by said stream of gas; splitting the solids treated in the gas-suspended state into more than two streams according to their gas-dynamic characteristics; and subjecting each of said streams to aftertreatment in a stream of gas flowing in a direction opposite to the direction of the stream of solids under treatment; the process parameters of said gas for aftertreatment of the solids being so selected as to provide downward motion of the solids under their own weight wherein said gas for said aftertreatment of said solids has a temperature not above 830°C, a pressure of about 49000 $n/m^2$, a flow velocity within the range of 0.2 to 1.4 m/sec, and the gas composition is characterized by the relation of contents $$C + H_2/CO + H_2 + CO_2 + H_2O$$

0.92, whereby metallization of iron- ore materials is carried out.

4. A method as claimed in claim 3, wherein the duration of said aftertreatment of said solids with said gas is within the range 120–180 sec.

* * * * *